INVENTORS
WILLARD A. RAMSEY
JERRY M. MINCHEY

BY B. P. Fishburne, Jr.
ATTORNEY

| ELEMENT RECEIVING LIGHT | | | | DESIRED CLOTH MOVEMENT | | | | |
|---|---|---|---|---|---|---|---|---|
| 1 | 2 | 3 | 4 | -X | +X | -Y | +Y | |
| V | | | | M | | | D | |
| | V | | | | D | | M | |
| | | V | | | M | D | | |
| | | | V | D | | M | | |
| V | V | | | | D | | M | |
| V | | V | | REPEAT LAST STEP | | | | |
| V | | | V | M | | | D | |
| | V | V | | | M | D | | |
| | V | | V | REPEAT LAST STEP | | | | |
| | | V | V | D | | M | | |
| V | V | V | | | M | D | | |
| V | V | | V | | D | | M | |
| V | | V | V | M | | | D | |
| | V | V | V | D | | M | | |
| V | V | V | V | -X | +X | -Y | +Y | PREVIOUS STEP |
| | | | | +Y | -Y | -X | +X | NEXT STEP |
| | | | | -X | +X | -Y | +Y | PREVIOUS STEP |
| | | | | -Y | +Y | +X | -X | NEXT STEP |

LEGEND

D — DESIRED MOVEMENT

M — MOVEMENT MADE TO PREVENT OSCILLATION WHEN DESIRED MOVEMENT WILL RETRACE PREVIOUS MOVEMENT

May 28, 1968 W. A. RAMSEY ET AL 3,385,245

ELECTRONIC CONTROL SYSTEM FOR A SELF-PROGRAMMING SEWING MACHINE APPARATUS

Filed Oct. 31, 1966 5 Sheets-Sheet 5

United States Patent Office 3,385,245
Patented May 28, 1968

3,385,245

ELECTRONIC CONTROL SYSTEM FOR A SELF-PROGRAMMING SEWING MACHINE APPARATUS

Willard A. Ramsey and Jerry M. Minchey, Greenville, S.C., assignors to Her Majesty Underwear Company, Mauldin, S.C., a corporation of South Carolina Filed Oct. 31, 1966, Ser. No. 590,669
13 Claims. (Cl. 112—2)

This invention relates to electronic control systems in general and more particularly to a high-speed digital electronic control system for sewing machine apparatus and the like which is self-programming in order to automatically stitch completely around or partially around appliques, pockets, or any arbitrary shape in any random position.

The present invention is related to copending application U.S. Ser. No. 590,641, filed Oct. 31, 1966, by Willard A. Ramsey and Jerry M. Minchey, which application is assigned to the assignee of the present invention. Said copending application discloses a high-speed digital electronic control system for sewing machine apparatus wherein a programmer, for example, a perforated tape reader, is used to feed control information into the system to control the operation thereof. Electrical step motors operate to move a work frame such as a fabric frame for cloth to supply controlled intermittent step motion in both an X and a Y axis with respect to a sewing means including a sewing head each time the sewing needle in the head is out of the cloth during each stitching cycle. The perforated tape reader feeds electrical control signals into an X and a Y logic circuit which is also coupled to a timing means in the form of an angular transducer coupled to the drive motor for the sewing means. Command signals from the X–Y logic circuit are coupled to the step motors at selected angular intervals during the time the needle is out of the cloth during each sewing cycle. The frame is adapted to step either in the X or Y direction, for example, several times each cycle in response to the information fed to the X and Y logic circuit from the tape reader during each stitching cycle.

It is an object of the present invention to provide an electronic control system for sewing machine apparatus which is capable of self-programming itself to automatically follow an edge of a work piece and perform a sewing operation thereat.

It is another object of the present invention to provide an automatic sewing machine apparatus which will hunt for the edge of a work piece and follow the edge while performing a sewing operation thereat with the added protection against oscillation.

It is still another object of the present invention to provide a self-seeking electronic control system for sewing machines and the like where the work, for example, a piece of cloth which is to be stitched to another, is moved along rectangular axes relative to the sewing head each time the needle is out of the work in accordance with a predetermined logic.

Yet another object of the present invention is to provide a self-programming electronic control system for sewing machines having the capability of hunting for the edge of the fabric and wherein the hunting pattern is determined one step at a time based on the information contained in a memory concerning the previous direction of sewing and the last step made before reaching or leaving the edge of the fabric.

Briefly, the subject invention contemplates coupling electrical step motors to a work frame such as a cloth frame to supply a controlled intermittent step motion in both an X and a Y axis with respect to a sewing means which includes a sewing machine head, a needle, and a presser foot, each time the needle is out of the cloth during a stitching cycle. Fabric sensing means comprising four sensors which may be, for example, photocells are circumferentially located around the needle in the presser foot of the sensing means and each sensor produces an electrical output signal depending upon whether or not it senses a predetermined number of layers of fabric located on the work frame. Noting that there are sixteen possible combinations of signals of four things taken zero through four at a time, the output signals from the detection devices are fed to a self-programming logic circuit which will feed command signals to the electrical step motors in a predetermined logic sense such that a hunting pattern is generated which will cause movement of the step motors one step at a time during the time the needle is out of the cloth to search for the edge of the cloth and follow the edge of the cloth to perform a sewing operation along the edge without the requirement for external control. The subject invention is capable of automatically stitching around the edge of appliques or pockets, etc., without need of a human operator or a predetermined recorded program.

Other objects and advantages of the present invention will become more apparent as the following detailed description is read in conjunction with the following drawings wherein like reference characters are employed to designate like elements throughout.

Figure 1:
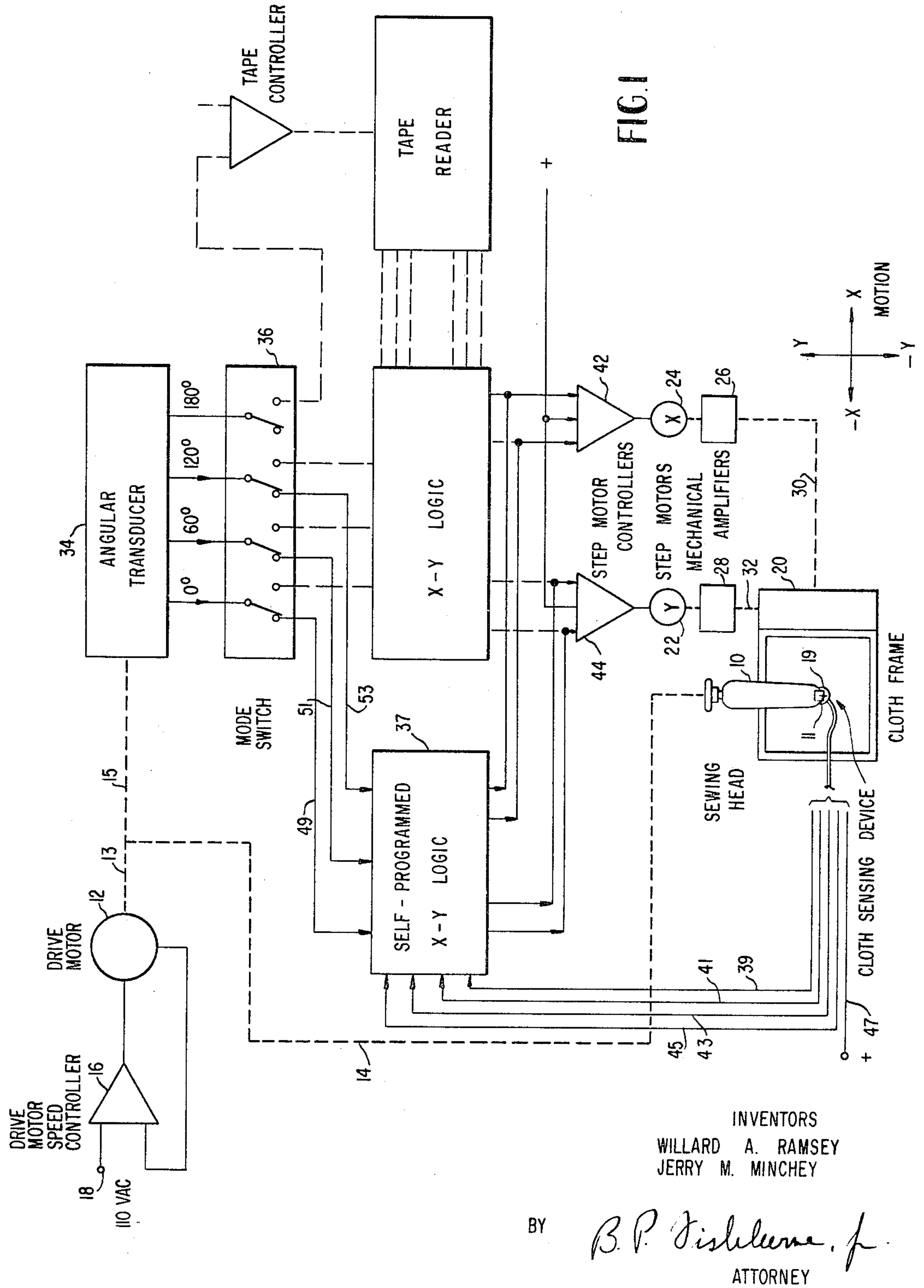
FIGURE 1 is a block diagrammatic representation of the preferred embodiment of the subject invention.

Directing attention now more particularly to the drawings, in FIGURE 1 there is shown a sewing means comprising a sewing head 10 mechanically coupled to an electric drive motor 12 by means of a mechanical linkage, shown schematically and designated by reference numeral 14. The drive motor 12 includes a drive shaft shown schematically as element 13. The mechanical linkage 14 is also connected thereto. The drive motor 12 is adapted to be controlled by means of a speed controller 16 which is powered from a source of AC line voltage applied at terminal 18. A work frame 20 adapted to hold fabric under tension for operation thereon by said sewing head is adapted to move back and forth along rectangular coordinate (X and Y) axes perpendicular to the sewing head by means of electrical step motors 22 and 24. The step motors 22 and 24 are respectively coupled to the frame 20 by means of the mechanical amplifiers 28 and 26 and the respective mechanical linkages 32 and 30. These linkages are adapted to convert the rotary motion of the step motors into linear motion required to move the frame back and forth along the X and Y axis.

The sewing means shown in FIGURE 1 also includes a needle 11 and presser foot assembly 19 circumferentially located with respect to the sewing needle 11 so that the needle is adapted to move through the presser foot to perform a sewing operation upon the fabric held by the frame 20. The presser foot assembly 19 has located therein a plurality of cloth sensors not shown which provide output signals to a self-programmed X–Y logic circuit 37. For example, in the instant invention, four sensors will be included therein and their outputs will be coupled to the self-programmed X–Y logic circuitry by means of circuit leads 39, 41, 43 and 45. A positive electrical potential from a source not shown is coupled to each of the sensors included in the presser foot assembly 19 by means of circuit lead 47. The presser foot assembly and the associated fabric sensors will be shown and described in greater detail subsequently.

Also coupled to the drive motor 12 is a timing means 34 comprising an angular transducer which is adapted to produce timing or enabling signals at selected angular positions of the drive shaft 13 such that timing pulses are produced at angular positions corresponding to 0°, 60°, 120° and 180° during one-half revolution of the drive motor 12. The position where the needle 11 just leaves the fabric on the up stroke will be defined as the 0° position. The timing signals forming the output of the angular transducer 34 are coupled to a mode switch 36 which is shown to couple the three outputs corresponding to 0°, 60° and 120° from the angular transducer to the self-programmed X–Y logic circuit block 37. The output signal corresponding to 180° is unused in the apparatus corresponding to the subject invention whereas it is required for the operation of the invention described in the aforementioned copending application Ser. No. 590,641. In the aforementioned invention, the step motors are driven by means of command signals applied thereto in accordance with information fed to an X–Y logic circuit from a prerecorded program fed from a tape reader as timing or enabling pulses were fed from the angular transducer 34 through the mode switch 36.

In the present invention with the mode switch 36 positioned as shown, timing or enabling pulses are coupled to the self-programming X–Y logic circuit 37 by means of leads 49, 51 and 53. The inputs from the fabric or cloth sensors, not shown, in the presser foot assembly 19 are coupled thereto by means of leads 39, 41, 43 and 45. These inputs determine the relative position of one or more layers of fabric on the cloth frame 20 which when fed into the self-programming X–Y logic circuit 37 a predetermined logic will be performed in accordance with the information fed thereto. Command signals are generated by the X–Y logic circuitry and are coupled to the step motor controllers 42 and 44 at the times corresponding to the angular positions of 0°, 60° and 120°. The predetermined logic which will be explained more fully will drive the step motors 22 and 24 through their respective motor controllers 42 and 44 to cause the frame 20 to move in a predetermined hunting pattern until the edge of a layer of fabric is sensed whereupon the edge will be followed and a sewing operation performed.

Figures 4, 5, 6:
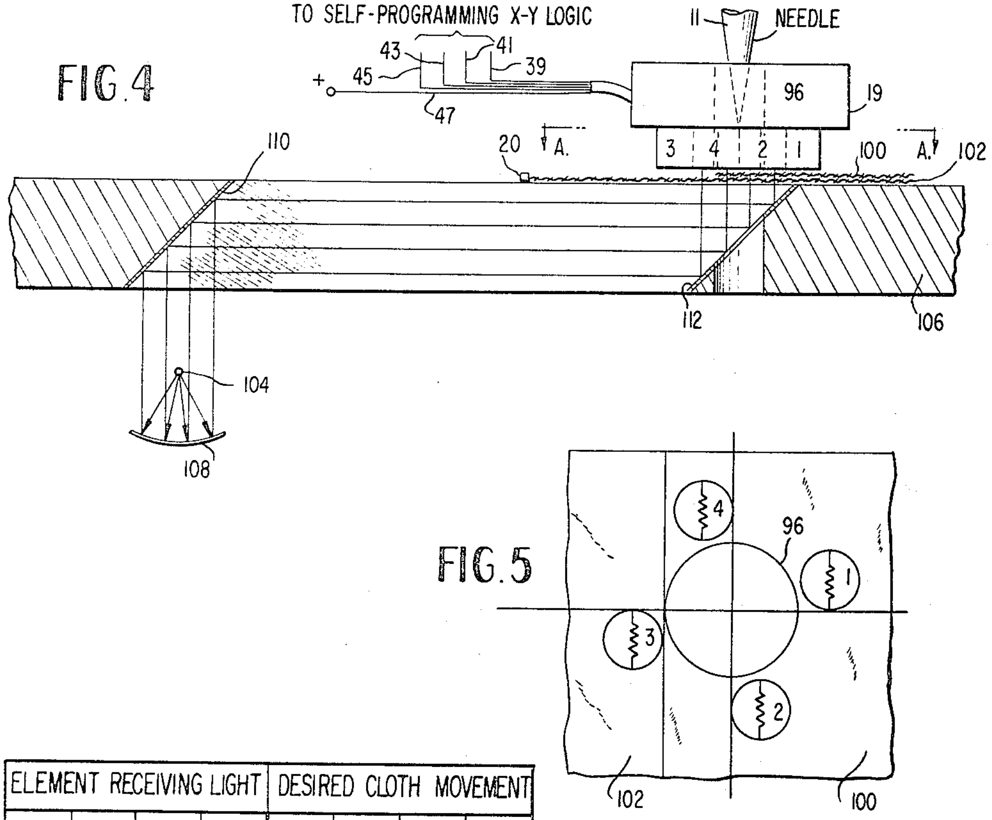
FIGURE 4 is a side elevational view partly is cross-section illustrating one embodiment of the fabric sensing means.
FIGURE 5 is a sectional view of FIGURE 4 taken along line A—A.
FIGURE 6 is a table illustrating the desired self-programming logic.

As noted above, the self-programming logic operates on the principle that there are only sixteen possible combinations of four things taken zero through four at a time. The possible cloth movement that is made for each of these sixteen possible combinations is shown in FIGURE 6 and will be explained subsequently. The logic circuit 37 moreover is adapted to include a memory so that the system is protected from oscillation by having the logic compare each proposed movement of the cloth frame 20 with the preceding movement made and stored in the memory. If the movement specified is opposite of the last movement made, i.e., when the desired movement will retrace the previous movement, the logic will designate a second choice movement which will be made instead of the desired or first choice movement. The system additionally has the capability of hunting for the edge of fabric if all four sensors detect two layers of cloth, one layer of cloth or no cloth. The hunting process moreover is not predetermining but instead the hunting pattern is determined one step at a time at each angular interval during one-half the sewing cycle when the needle is out of the cloth, based on the information contained in the memory concerning the previous direction of movement and the last step made before leaving the edge of the cloth. This will perform the least amount of hunting with the maximum protection against oscillation which would occur if the desired movement retraces the previous movement.

The output command signals from the X–Y logic circuit 37 will drive the step motors 22 and 24 either in a forward or a backward direction depending upon the nature of the logic performed corresponding to the inputs received from the cloth sensors located in the presser foot head. The motion of the step motors when applied to the mechanical amplifiers 26 and 28 drive the cloth frame along the X and Y coordinate axis, respectively, by means of linkages 30 and 32 which may be, for example, a leadscrew mechanism. For a single revolution of the drive motor 12, each step motor may take a plurality of steps, for example three, in either a clockwise or counterclockwise direction. The number of steps which may be taken is dependent on the design of the mechanical amplifiers utilized.

Figure 2:
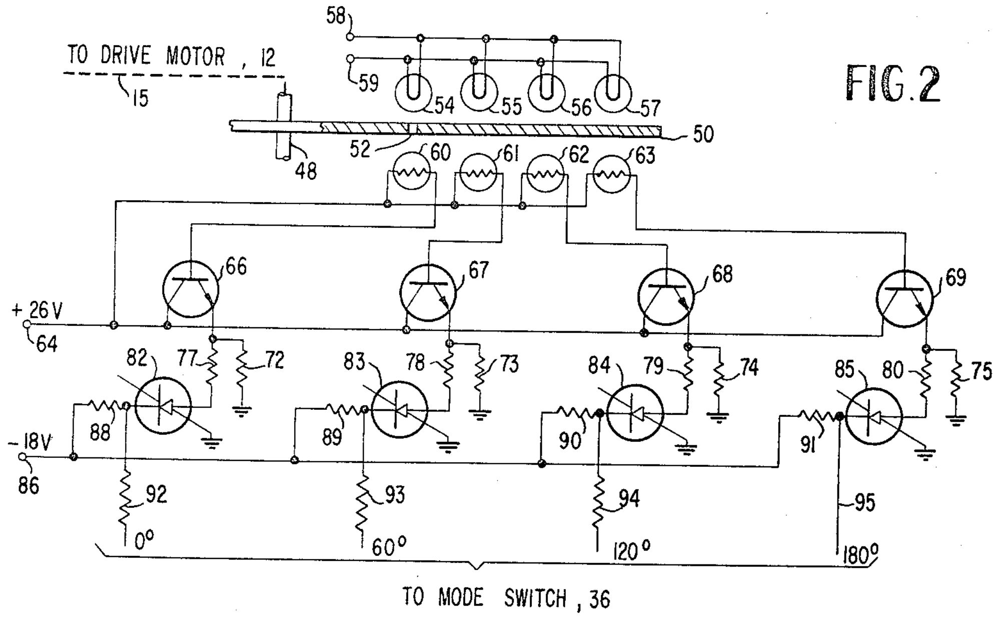
FIGURE 2 is a schematic diagram illustrative of the timing means utilized by the subject invention and which comprises an angular transducer as shown in FIGURE 1.

Considering the invention now in greater detail, attention is directed to FIGURE 2 which illustrates the embodiment of the angular transducer 34 shown in FIGURE 1. There is shown a mechanical coupling 15 to the drive shaft 13 of the drive motor 12. This is connected to the spindle 48 of a perforated disc 50 which is adapted to have four openings 52 therein at selected angular positions. Light means comprising electric lamps 54, 55, 56 and 57 are placed on one side of the disc 50 and are adapted to be constantly energized by means of a small voltage applied thereto (6.3 volts AC) across terminals 58 and 59. On the opposite side of the perforated disc are four photocells 60, 61, 62 and 63 which are adapted to be illuminated by the lights 54, 55, 56 and 57, respectively, as the disc 50 rotates. The hole 52 is placed in the disc such that photocell 60 receives light from light 54 at a point where the needle in the sewing head 10 just clears the work piece. This establishes the angular position of 0°. Three other holes, not shown, are placed in the disc 50 such that photoelectric element 61 receives light at an angular position of 60°, photoelectric element 62 receives light at the 120° position and, finally, the photoelectric element 63 receives light at the 180° position.

One side of photocells 60–63 is coupled to a positive voltage source (+26 volts) applied to terminal 64 while the opposite terminals thereof are respectively coupled to the bases of transistors 66, 67, 68 and 69. The collector electrodes of the transistors 66 through 69 are also commonly connected to the positive DC voltage (+26 volts) providing a bias supply voltage thereto. The emitter of transistor 66 is returned to a point of reference potential illustrated as ground through resistor 72. Likewise transistors 67, 68 and 69 have their respective emitters coupled to ground through resistors 73, 74 and 75. This configuration provides what is known to those skilled in the art as an emitter follower circuit. Also coupled to the emitter of transistor 66 is a second resistor 77 which is connected to the anode electrode of a controlled rectifier 82. Similarly, the emitters of transistors 67–69 are coupled to anodes of respective controlled rectifiers 83, 84 and 85 by means of resistors 78, 79 and 80. The cathode electrodes of the controlled rectifiers 82, 83, 84 and 85 are returned to a source of negative potential (−18 volts) applied to terminal 86 by means of resistors 88, 89, 90 and 91. Resistors 92, 93 and 94 are coupled from the cathodes of controlled rectifiers 82, 83 and 84 to the mode switch 36 as shown in FIGURE 1. Circuit lead 95 directly connects the cathode of controlled rectifier 85 to the mode switch 36.

In operation, as the perforated disc rotates one revolution per sewing cycle as provided for by drive motor 15, photocells 60, 61, 62 and 63 are sequentially illuminated by their respective light means 54, 55, 56 and 57 at angular positions corresponding to 0°, 60°, 120° and 180° of the sewing cycle. When photocell 60 is illuminated at the 0° position, its resistance is lowered and transistor 66 is rendered conductive by means of the base current supplied thereto due to the resistance change. The turning on of the transistor 66 produces a signal across the emitter resistor 72 which is then coupled to the anode of the controlled rectifier 82 by means of the resistor 77, also rendering it conductive. When the controlled rectifier 82 turns on, an enabling signal is produced across the resistor 88 which is positive going due to the fact that the cathode is supplied from a −18 volt supply. This enabling signal is then coupled to the mode switch 36 shown in FIGURE 1 by means of the resistor 92. Likewise, enabling signals are produced at the cathodes of controlled rectifiers 83, 84 and 85 when the respective photoelectric elements 61, 62 and 63 are energized.

Figure 3:
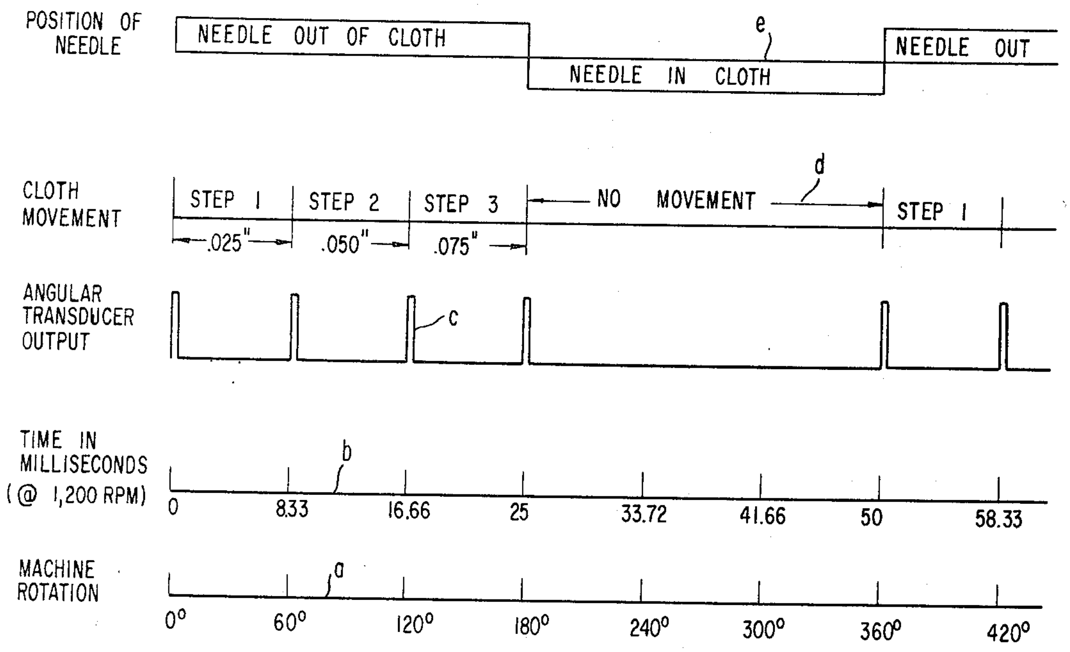
FIGURE 3 is a timing diagram helpful in understanding the operation of the present invention.

FIGURE 3 is a timing diagram helpful in understanding the operation of the subject invention considering the block diagram shown in FIGURE 1 and the timing means comprising an angular transducer as shown in FIGURE 2. Diagram *a* of FIGURE 3 shows one cycle of machine rotation corresponding to the drive motor 15 and selectively designates angular positions every 60° over the entire cycle. Thus, 360° would be considered one sewing cycle in which a complete stitch has been made by the needle 11 contained in the sewing head 10. Diagram *b* is similar to diagram *a* with the exception that time has been substituted for angular position noting that at a machine rotation of 1200 r.p.m., 60° of rotation is traversed in 8.33 milliseconds. Diagram *c* is illustrative of the transducer output described with respect to FIGURE 2 and shows a timing pulse being generated at angular positions of 0°, 60°, 120° and 180° with no timing pulses being generated over the second half of the cycle from 180° to 360°. Diagram *d* illustrates that three discrete steps can selectively be made by the frame 20 shown in FIGURE 1 per sewing cycle with each step being .025 inch in length. Note that the steps occur during the first half cycle whereas no movement of the cloth frame occurs during the second half cycle. Diagram *e* illustrates the position of the needle 11 in the sewing head during a sewing cycle. More particularly, during the first half cycle (0°–180°), the needle is out of the cloth whereupon the cloth frame 20 is adapted to be moved, whereas in the second half cycle (180°–360°), the needle is in the cloth and the cloth frame is at rest.

Considering FIGURES 4 and 5 together, there is shown schematically four photocells labeled one, two, three and four (FIGURE 5) circumferentially located equidistantly around the opening 96 in the presser foot 19. The photoelectric elements 1–4 are located on the underside of the presser foot 19 and the needle 11 is allowed to pass through the opening 96 in an up and down reciprocating motion. The photocell elements 1–4 moreover are offset from rectangular coordinates which are normal to the axis of the needle 11 such as shown in FIGURE 5. FIGURE 5, moreover, shows a sectional view taken along the lines A—A of FIGURE 4 and shows the offset arrangement of the photoelectric elements 1 through 4 with respect to the axis of the needle. FIGURE 4 also clearly illustrates two layers of cloth 100 and 102 positioned under the presser foot assembly 19 with the fabric layer 100 being placed on layer 102. The presser foot assembly 19 is shown located over the fabric layers 100 and 102 such that photoelectric elements 1, 2 and 4 cover both layers 100 and 102 while photoelectric element 3 only covers layer 102. This is more clearly shown in FIGURE 5. A light source 104 is located beneath the sewing table 106 and the light emanating therefrom is directed through the layers of fabric 100 and 102 to the photoelectric elements 1, 2, 3 and 4 by means of the reflectors 108, 110 and 112.

The photocell arrangement, then, provides a sensor head for detecting the presence of one or more layers of cloth by the amount of light sensed by each of the photocells 1–4. The present invention contemplates utilizing the electrical output signals from each of the photocells 1–4 to cause the frame 20 to move in such a manner so as to seek out and follow an edge of a layer of fabric. More specifically, it is contemplated that one layer of fabric such as layer 100 is to be sewn automatically on the layer 102. Considering FIGURE 4 and the arrangement shown, photocells 1, 2 and 4 will receive relatively less light than photocell 3. When an energizing potential is applied to the four photocells 1–4 by means of the lead 47, the resistance change in photocell 3 will be proportionately more than the change in photocells 1, 2 and 4. By arbitrarily defining the condition wherein light passes through two layers of fabric, e.g., 100 and 102, as a condition where no light is received by the photocells and defining the condition where light passes to the photodetector through one or no layer of fabric, e.g., 102, as a condition where light is received, sixteen possible combinations of output signals will appear on leads 39, 41, 43 and 45 depending upon the location of the four photocells with respect to both layers of fabric 100 and 102.

By including a memory for remembering the preceding movement made, a logic can be developed from the sixteen (16) combinations that will produce a hunting pattern without oscillation whereby an edge of the fabric will be located and followed. FIGURE 6 is a table illustrative of the logic incorporated into the subject invention. For twelve (12) of the combinations, two possible movements of the frame are desired. For example, in the first row, there is shown the condition wherein photocell element 1 receives light while elements 2, 3 and 4 do not receive light. In this case, the logic circuit would produce a command signal to move the cloth frame 20 in a +Y direction of one step, as indicated by the D which stands for "the desired movement." It should also be noted that under the −X column appears the letter M. This indicates that the first choice movement or the desired movement is in the +Y direction; however, if the desired movement will retrace the previous movement, an oscillatory condition will occur and therefore a second choice command would be to move the cloth frame one step in the −X direction. Taking the second row where photocell 2 receives light, while elements 1, 3 and 4 do not receive light, the desired movement would be one step in the +X direction with a second choice being in the +Y direction. In the situation where photocell elements 1 and 3 receive light, 2 and 4 do not receive light, and vice-versa, the command will be to "Repeat the Last Step." In the conditions where all of the photocells 1–4 either receive light or receive no light at all, a hunting process will occur until a combination exists where at least one of the photocells receives light or receives no light at all. In this case, considering the situation where all of the photocells receive light, if the previous step of the cloth frame was in the −X direction, the command will be to move the frame in a +Y direction and after the +Y direction, the next step would be in the +X direction, thence to the −Y direction and finally the −X direction. The situation where all of the photocells would receive light is in the situation where the second layer of fabric 100 is not under any of the photocells. The second layer 102 of fabric, however, would be completely under all of the sensors and a hunting process would be established such that if the previous step was in a −X direction, the next step commanded would be in the −Y direction, etc.

Figure 7A:
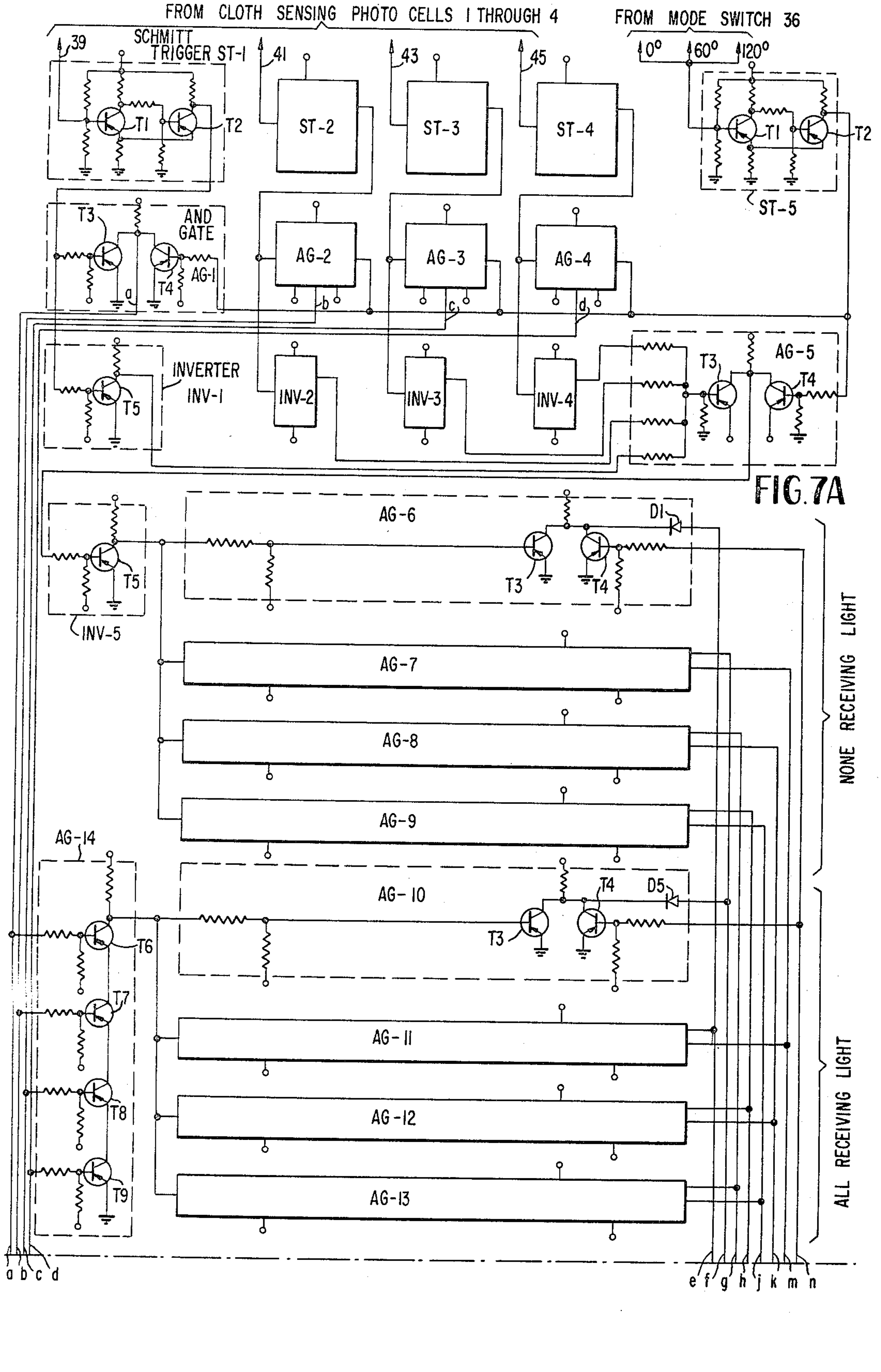
FIGURES 7A and 7B are illustrative of the preferred embodiment of the self-programming X–Y logic circuitry utilized by the subject invention.
Figure 7B:
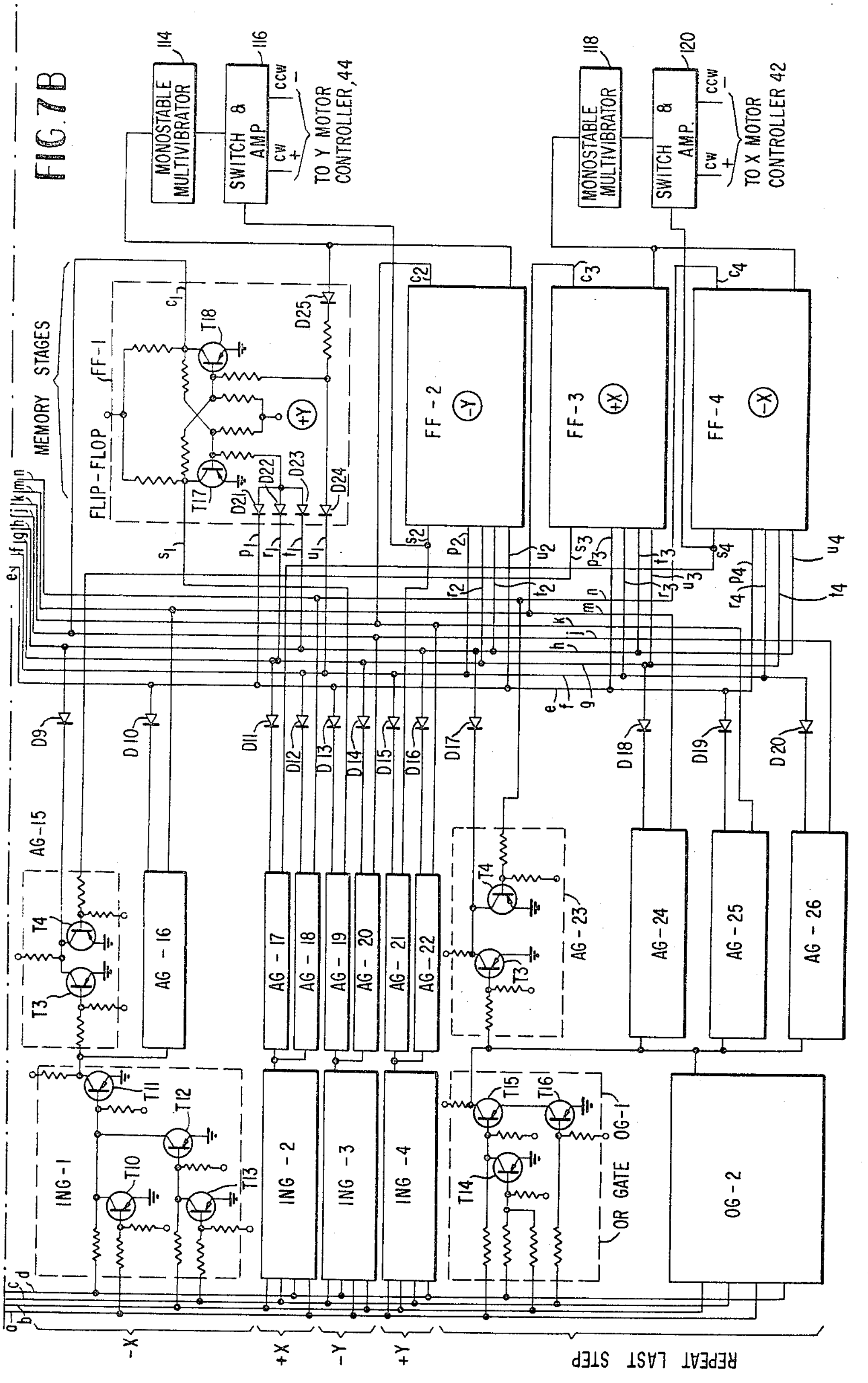

This logic is performed in the Self-Programming X–Y logic circuit 37 which is illustrated in detail in FIGURES 7A and 7B. Considering the circuitry in detail, the output leads 39, 41, 43 and 45 from the photocells 1–4 in the presser foot assembly 19 are connected to Schmitt trigger circuits ST–1, ST–2, ST–3 and ST–4, respectively, each comprising transistors T1 and T2. The 0°, 60° and 120° timing signals from the angular transducer 34 are commonly connected to the input of a fifth Schmitt trigger circuit ST–5. The Schmitt triggers provide a definite on or off condition with fast rise time and fall time for a predetermined threshold level and moreover with respect to the transducer 34 output, it provides a uniform wave shape regardless of the rotational speed. The output from the Schmitt trigger circuit ST–5 is commonly connected to one input of AND gates AG–1 through AG–4, each comprising transistors T3 and T4. The outputs of the Schmitt trigger ST–1 through ST–4 are respectively connected to the other input of AND gates AG–4 through AG–4. The result of this circuit connection is that if any photocell 1–4 receives light, there will be provided an output at the corresponding AND gates AG–1 through AG–4 when enabling signals are coupled from ST–5 at the 0°, 60° and 120° angular position. For example, if photocell 2 is receiving light at 0°, there would be a signal appearing at the output of AND gate AG–2 at 0°. If, on the other hand, photocells 1 and 3 are receiving light at 60°, output signals will appear at AND gates AG–1 and AG–3. If no photocell is receiving light at the 120° angular position, there would be no output from any of the AND gates AG–1 through AG–4 at the 120° because there would be no inputs provided to any of the AND gates. The outputs of the four AND gates AG–1 through AG–4 are connected to the cell buss wires *a, b, c* and *d.*

It should be pointed out also that the output of the Schmitt trigger circuits ST–1 through ST–4 are respectively coupled to inverter circuits INV–1 through INV–4, each comprised of a transistor T5. The outputs of these inverter circuits are commonly coupled to one input of an AND circuit AG–5 which has as its other input the output from the Schmitt trigger circuit ST–5. This circuit combination exists for making the decisions enabling the machine to search for the edge of the fabric when the needle and presser foot are over on the fabric far enough that no photocell can detect the edge of the fabric, i.e., none of the photocells 1–4 receive light. Also associated with the inverter circuits INV–1 through INV–4 is a logic section labeled "none receiving light" and comprises four AND gates AG–6, AG–7, AG–8 and AG–9. The AND gates AG–6 through AG–9 are identical in so far as circuitry is concerned and are shown in detail with respect to AND gate AG–6. The output of the AND gate AG–5 is coupled to each of the inputs of AND gates AG–6 through AG–9 by means of the inverter circuit INV–5. The inverter circuit INV–5 is similar to the inverter circuit INV–1 and comprises a single transistor T5 having the output of AG–5 applied to its base and the output taken from its collector of T5. The circuit configuration of the AND gate AG–6 comprises two transistors T3 and T4 commonly connected at their collectors with one transistor T3 having its base fed from the collector of INV–5 whereas the base of the other transistor T4 is coupled to the circuit buss *n.*

In addition to the "none receiving light" sections, there are three additional logic sections entitled "all receiving light," the "–X, +X, –Y, +Y" and "repeat last step" sections. The "all receiving light" section is comprised of AND gates AG–10, AG–11, AG–12 and AG–13. These AND gates moreover have a common input applied thereto from the AND gate AG–14 which is comprised of transistors T6, T7, T8 and T9 and respectively coupled to the cell buss wires *a, b, c* and *d.* The second input to the AND gates AG–10 through AG–13 are applied through buss wires *n, m, k* and *j*, respectively. The outputs therefrom are coupled through steering diodes such as diode D–5 shown in AG–10 to their respective buss wires *f, e, h* and *g.*

Proceeding now to FIGURE 7B, there is shown the circuitry required for the "–X . . . +Y" section at the "repeat last step" section. Also disclosed therein is the memory circuit required. The "–X . . . +Y" section is comprised of AND gates AG–15 through AG–22 and requires two AND gates for each directional movement. For example, the –X portion is comprised of AG–15 and AG–16 in combination with an input gate circuit ING–1. The input gates ING–1 through ING–4 are identical in configuration and comprise four transistors coupled together as shown with respect to ING–1. ING–1 comprises transistor T–10, T–11, T–12 and T–13. The output is taken from the collector electrode of transistor T–11 and applied commonly to the AND gates AG–15 and AG–16. The inputs are as follows. The input to transistor T–11 is applied through the cell buss wire *d* whereas transistor T–10 receives an input from buss *a* and similarly transistors T–12 and T–13 receive inputs from buss wires *b* and *c*, respectively.

Similarly, the +X portion comprises AND gates AG–17 and AG–18 in combination with the input gate ING–2. The –Y and +Y sections employ AND gates AG–19 and AG–20, etc. The inputs to the input gates ING–1 through ING–4 are applied through the cell buss wires *a, b, c* and *d.* The outputs of the AND gates AG–15 through AG–22 are taken from the respective diodes D–9 through D–16. Moreover, the input gates ING–1 through ING–4 supply one input to their respective AND gates which have their other input applied through the circuit buss wires *m, n, j* and *k.*

The "repeat last stop" section includes two OR gates OG–1 and OG–2 and four AND gates AG–23 through AG–26. With respect to the OR gates OG–1 and OG–2, each comprises transistors T–14, T–15 and T–16 with inputs applied to the bases from the cell buss wires *a, b, c* and *d* such that transistor T–14 receives a dual input from buss wires *b* and *d* whereas transistor T–15 receives an input from buss wire *a* and transistor T–16 receives input from buss wire *c*. The output of OR gate OG–1 is taken from the collector of transistor T–15 and applied to the base of transistor T–3 of AND gate AG–23 as well as the respective inputs of AG–24 through AG–26. The output of the AND gate AG–23 through AG–26 is taken from the respective diodes D–16 through D–20 while the second input to the AND gates AG–23 through AG–26 is applied to the respective base of the transistor T–4 from the buss wires *n, m, k* and *j*, respectively.

The self-programming logic circuitry also includes four memory stages comprising flip-flop circuits FF–1, FF–2, FF–3 and FF–4 and correspond to the memory for a previous step of +Y, –Y, +X or –X. Each of the transistor flip-flops are comprised of transistors T–17 and T–18. All of the flip-flops are similar and the two outputs are taken from the collectors of transistors T–17 and T–18 on lines S–1 and C–1 respectively. Similarly, the outputs of the other flip-flops correspond to S–2, C–2 and S–3 and C–3, respectively, etc. The S output line is at –18 volts when the flip-flop circuit is "set" and 0 volts when it is "clear." The C output line is at –18 volts when the flip-flop is "clear" and 0 volts when it is "set." The "set" input signal is applied through D–24 to the base of T–18 while the "clear" input is applied to the base of T–17 through any one of three diodes D–21, D–22 and D–23 over lines for example $p_1$, $r_1$ and $t_1$.

Before proceeding with the explanation of the logic circuits, it will be helpful to first understand the operation of the memory stages comprising flip-flops FF–1 through FF–4. The four memory stages work together to perform the function of always keeping the last step made by the step motors stored in the memory. This information is used by the logic circuits to make the decision to make the first choice step D or the second choice step M according to the table shown in FIGURE 6. It is also used in the sections which "repeat the last step" and in the "searching" sections which comprise the circuitry which all or none of the photocells 1–4 in the presser foot assembly 19 are energized.

For purposes of explanation of the operation of the memory stages, FF–1, FF–2, FF–3 and FF–4 assume first that the last step made was a step in the +X direction. Assume also that a signal comes in on the input buss $u_1$ to the +Y memory stage FF–1. It would go through diode D–24 to the "set" input of the flip-flop FF–1 which would "set" the +Y memory, i.e., line $C_1$ would then be at 0 volts while $S_1$ would be at −18 volts. The signal will also go through diode D–25 to the monostable multivibrator 114 and switching circuit 116 to step the Y step motor 22 shown in FIGURE 1 in the clockwise CW (+) direction. The monostable multivibrator and switching circuit are shown in detail in FIGURE 4 of the copending application Ser. No. 590,-641, identified above. The signal on the +Y memory input buss $u_1$ is connected to the buss wire *f* which is also coupled to input buss leads $p_2$, $r_3$ and $r_4$ which are applied to respective transistor T–17 to "clear" any of these memory stages which might previously have been in the "set" state. In the particular example, it was the +X or FF–3 memory stage that was in the "set" state. Now the memory has +Y stored as the last step taken instead of +X and all other memory stages are "clear." This procedure is followed by each signal that appears on any of the memory input buss wires *p, r, t* and *u*. Subsequent explanation will only explain how the signals are applied to the memory input buss wires since the above recited procedure is repeated each time.

The logic circuits which make the decisions will now be explained. Considering first the "none receiving light" section, this section makes the decisions enabling the apparatus forming the subject invention to search for the edge of the cloth when the needle 11 and presser foot 19 are over both layers of fabric 100 and 102 enough that no photocell 1 through 4 can detect the edge of the upper layer 100.

If the reverse of the last step made before getting into the "none receiving light" position was made, this would put the needle and presser foot back on the edge of the fabric; however, the instruction for the next step would be the same as it was in the present location before. In other words, the next step would put it back away from the edge of the fabric. As can easily be seen, this would start the apparatus to oscillate between the two locations. Oscillation is prevented by the following searching pattern outlined with respect to FIGURE 6 for the lowermost row. Note that if the previous step was −X and no photocell 1–4 was receiving light, the next step would be −Y. If the previous step was +X and no photocell is receiving light, the next step would be +Y, etc. A signal will now be traced through the "none receiving light" section. The output of the Schmitt triggers ST–1 through ST–4 pass through respective inverter amplifiers INV–1 through INV–4 to the inhibit input of AND gate AG–5. The other input to the AND gate AG–5 comes from the angular transducer 34 by means of the mode switch 36 and the Schmitt trigger circuit ST–5. At 0°, 60° or 120° when a timing signal comes from the transducer 34, an enabling signal will be produced by the Schmitt trigger circuit ST–35 and applied to the input of transistor T–4 of AG–5. If none of the four photocells 1–4 are receiving light, there will not be a signal on the input of T–3 of AND gate AG–5 and an output signal will occur at the 0°, 60° and 120° positions. This output is applied to the base of transistor T–5 of inverter circuit of INV–5 and then to one input of AND gates AG–6 through AG–9. Assuming the last step made was in the +Y direction, there will also be a signal at the other input of AND gate AG–9 which is coupled to the +Y memory stage FF–1 by means of circuit buss *j*. With a signal at both inputs of AND gate AG–9, there will be an output therefrom which goes through diode D–4 (not shown) to the −X memory input buss $u_4$ on buss lead *h* to "set" it. The function tabulated in FIGURE 6 shows that if no photocell 1–4 was receiving light and the previous step was +Y, then the next step desired would be in the −X direction. If all the photocells 1–4 do not see any light after taking the −X step, then at 60° one step will be made in the −Y direction by having a trigger signal apply to FF–2 over buss lead $u_2$ which is coupled to diode $D_1$ of AG–6. This procedure is continued until one of the photocells one through four detect the edge of the fabric cloth by sensing light through a single layer 102.

When the needle 11 and presser foot 19 are off of the fabric completely or sense only one layer 102, all of the photocells will receive light and again a searching operation must be established that will put the needle and presser foot back on the edge of the fabric without causing oscillation. This logic is performed as specified in the "all receiving light" section as shown by the table in FIGURE 6 and the next to last row. Again, the logic is based on the information of the previous step made which is stored in the memory stages FF–1 through FF–4. For example, if all the photocells 1–4 are receiving light and the previous step was −X, the next step would be in the +Y direction. The pertinent logic circuits entitled "all receiving light" make these decisions in the following manner. If all of the photocells are receiving light, then at 0°, 60° or 120° there will be a signal on all four photocell buss wires *a, b, c* and *d* due to the action of Schmitt triggers ST–1 through ST–5 in combination with the AND gates AG–1 through AG–4. This will provide AND gate AG–14 with four simultaneous inputs to transistors T–6 through T–9 wherein AND gate AG–14 will provide an output only when it has a signal at each of its four inputs. The output of the AND gate AG–14 is commonly applied to AND gates or to one input of AND gate AG–10 through AG–13. These four AND gates determine the searching sequence for the "all-receiving light" section the same way AND gates AG–6 through AG–9 did for the "none-receiving light" section.

Considering the "−X . . . +Y" section, an examination of FIGURE 6 will disclose that there are three combinations of photocells receiving light that require a −X movement as the first choice movement D. These combinations are photocell 4 alone, photocells 3 and 4, or photocells 2, 3 and 4. An output from transistor T–11 of the input gate ING–1 will only be produced if one of these three combinations exists as determined by the operation of transistors T–10, T–11, T–12 and T–13. The output of transistor T–11 is applied simultaneously to the input of AND gates AG–15 and AG–16. The other inputs of these two AND gates come from the $S_3$ and $C_3$ outputs of the +X memory stage FF–3. If the +X memory is clear, meaning that the last step made was not +X, then there will be an output from AND gate AG–15 going to the −X memory input buss wire $u_4$ over lead *h*.

If the +X memory FF–3 is "set" when the signal goes to AND gates AG–15 and AG–16, this signifies that the last step made was +X. If a −X step is made, oscillation would begin because the next step would again be +X. To prevent this occurrence, there will be an input to AND gate AG–16 instead of AG–15 and correspondingly an output from AND gate AG–16 goes to the −Y memory input $u_2$ of FF–2. −Y is the second choice movement M and is made any time that a −X movement would cause oscillation.

The "−X . . . +Y" section chooses the proper combination of photocell 1–4 inputs to make its respective steps and also decides when to make the first D or second M choice step based on information stored in the memory stages FF–1 through FF–4 in exactly the same manner as was described with respect to the −X portion thereof.

FIGURE 6 also illustrates that there are two combinations of photocells 1 through 4 that require a frame movement of "repeat last step." These combinations occur when photocells 1 and 3, and 2 and 4, receive light. Thus, if either of these two conditions exist, there will be an output from OR gates OG–1 and OG–2 which is applied to AND gates AG–23 through AG–26. The other input for each of these AND gates comes from one of the four memory flip-flops FF–1 through FF–4. For example, AG–23 receives the other input from the $C_4$ output lead from FF–4 over circuit buss $n$. The output of each of the AND gates AG–23 through AG–26 goes to the same memory as the input to that AND gate. For example, as noted with respect to AND gate AG–23, the input is applied from the $C_4$ output from FF–4. However, the output therefrom for the output of the AND gate is applied to the input buss line input buss wire $u_4$ through the diode D–17. Therefore, the next step made in this section is always the same as the last step made.

In each case, the memory stages FF–1 through FF–4 deliver pulses to the monostable multivibrators 114 and 118 for operating the X and Y step motors 24 and 22 by means of their respective motor controllers 42 and 44. More particularly, the +Y and −Y flip-flops FF–1 and FF–2 are coupled to monostable multivibrator 114 whereas the +X and −X flip-flop FF–3 and FF–4 are connected to the monostable multivibrator 118.

What has been shown and described therefore is a self programming automated sewing machine apparatus which is adapted to search for and locate the edge of the layer of fabric in response to a fabric sensing device located on the sewing head of the sewing means. The signals produced by the cloth sensing device is fed into a logic circuit which generates command signals for the X and Y step motors in accordance with predetermined logic which incorporates a hunting capability and an edge following capability once the edge has been detected. In this manner, a self-determining motion along both the X and the Y axis is provided whereby automatic stitching around the appliques or pockets may be done without the intervention of a human operator.

While the present invention has been particularly shown and described with reference to a preferred embodiment thereof, it will be understood by those skilled in the art that various changes in the form of details may be made without departing from the spirit and scope of the invention. For example, when desirable, another type of fabric sensing device could be used such as one employing a capacitance method. This could be accomplished by putting a high frequency signal on the metal base under the presser foot and placing small metallic detectors in a non-conducting presser foot, the metal detector would pick up large or small signal strengths due to the difference in capacitance caused by the difference in dielectric effect of two pieces of cloth and one piece of cloth. Accordingly, it is not desired that the invention be limited to the specific arrangement shown and described, but it is to be understood that all equivalents, alterations and modifications within the spirit and scope of the present invention are herein meant to be included.

We claim:

1. An electronic control system for automated sewing machine apparatus and the like comprising, in combination: sewing means; fabric sensing means selectively located adjacent said sewing means to sense the presence and position of a work piece of fabric and generating a plurality of electrical signals in accordance therewith; first motor means including a drive shaft coupled to said sewing means for operating said sewing means; a frame adapted to hold said work piece of fabric under tension for operation thereon by said sewing means and operable to move in coordinate directions with respect to said sewing means; timing means coupled to said first motor means for generating a plurality of timing signals in accordance with the angular position of said drive shaft during each complete rotation thereof; second motor means coupled to said frame for moving said frame in said coordinate directions in response to command signals applied thereto; and a logic circuit coupled to said timing means and said fabric means, receiving input signals therefrom comprising said timing signals and said detection signals for generating said command signals applied to said second motor means, said logic circuit including means for determining an edge of said work piece in accordance with said detection signals from said fabric sensing means and causing said frame to move so that said sewing means follows and operates on said edge.

2. An electronic control system for automated sewing machine apparatus and the like, comprising, in combination: sewing means including a sewing head and a needle; fabric sensing means comprising a plurality of fabric sensors circumferentially spaced around the axis of said needle for sensing the preesnce and edge location of said work piece of fabric and generating an electrical detection signal in each sensor in accordance therewith; first motor means including a drive shaft coupled to said sewing means for operating said sewing means; a frame adapted to hold said work piece of fabric under tension for operation thereon by said sewing means and being located under said sewing head, said frame additionally being operable to move in rectangular coordinate directions with respect to said sewing head; timing means coupled to the drive shaft of said first motor means for generating a plurality of timing signals at selected angular positions during each rotation of said drive shaft; second motor means coupled to said frame for moving said frame in said rectangular coordinate directions in response to command signals applied thereto; and logic circuit means coupled to said timing means and said plurality of sensors and being responsive thereto to generate said command signals for selectively moving said frame in said rectangular coordinate directions, said logic circuit means including self-programming means for determniing an edge of said work piece in accordance with said detection signals received from said sensors and causing said frame to move so that said sewing head follows said edge and said needle stitches therealong.

3. An electronic control system for automated sewing machine apparatus and the like comprising, in combination: sewing means comprising at least one sewing head and a needle; first motor means including a drive shaft coupled to said at least one sewing head for operating said sewing means; fabric detector means comprising a plurality of fabric sensors circumferentially located around the axis of said needle and being responsive to one or more layers of fabric to produce an electrical detection signal by each sensor in accordance with the number of layers sensed; a frame adapted to hold said work piece of fabric under tension for operation thereon by said sewing head and said needle, being operable to move in rectangular coordinate directions in a plane normal to said axis of said needle; timing means coupled to said first motor means for generating a timing signal at selected intervals of a sewing cycle; second motor means coupled to said frame for moving said frame in a first rectangular coordinate direction in response to first command signals applied thereto; third motor means coupled to said frame for moving said frame in the other rectangular coordinate direction in response to second command signals applied thereto; and logic circuit means including memory circuit means, coupled to said timing means and said plurality of fabric sensors, being responsive to input signals applied therefrom to generate a first choice and a second choice first and second command signals for said second and third motor means, respectively, for providing a hunting pattern for said frame, thereby determining an edge of said fabric and following said edge one step at a time based on the information concerning the previous movement made by said frame and the signals presently produced by said fabric sensors.

4. The apparatus as defined in claim 3 wherein said second and said third motor means comprises: step motors and respective step motor controller means connected between said logic circuit and said step motors.

5. The apparauts as defined in claim 3 wherein said second and third motor means comprises: a step motor and a step motor controller coupled to said logic circuit means, and additionally including mechanical amplifier means coupled between said frame and said step motors for moving said frame in said rectangular coordinate directions.

6. The apparatus as defined in claim 3 wherein said timing means comprises: an angular transducer providing electrical timing signals at selected angular positions of said drive shaft for each revolution thereof.

7. The apparatus as defined in claim 3 wherein said plurality of fabric sensors each has a first and a second state of operation producing detector signals in accordance therewith and wherein said logic circuit comprises a self-programming logic comprising gating circuit means for gating said detector signals from said plurality of sensors therein in response to said timing signals fed from said timing means, first circuit means for determining the condition when all of said sensors are in said first state of operation, second circuit means for determining the state when all of said sensors are in said second state of operation, third circuit means for determining the condition when one of said sensors is in said first state of operation and all other sensors are in said second state of operation, and fourth circuit means coupled to said first, second and third circuit means and said memory circuit for producing said first and said second command signals in accordance with the operating states of said plurality of sensors and the output signal of said memory circuit to effect movement of said frame to hunt for the edge of said work piece in accordance therewith.

8. The apparatus as defined by claim 7 wherein said plurality of said sensors comprise photoelectric detector means and additionally including light means selectively located to produce a light path which is adapted to intersect said frame and selectively energize said photoelectric means.

9. The apparatus as defined in claim 3 wherein said fabric sensing means comprises four fabric sensing detectors circumferentially spaced around the axis of said needle equidistantly and offset from two coordinate axes normal to the axis of the needle.

10. The apparatus as defined in claim 3 wherein said fabric sensing means comprises a plurality of fabric sensors circumferentially, equidistantly spaced around and offset from two coordinate axes normal to the axis of the needle.

11. Apparatus as defined in claim 3 wherein said plurality of sensors each provide an output signal in response to the sensed condition of the fabric carried by said frame and wherein said memory circuit means is responsive to the immediately preceding output signal from each said plurality of sensors and providing a memory output thereby; first logic means responsive to said memory output and said outputs from each of said plurality of sensors for generating said first choice first and second command signal in accordance with a predetermined combination of said output signals from said sensors; second logic means responsive to said memory output and said output signals from said each of said sensors for generating said second choice first and second command signal when said first and second command signal effect movement along the same coordinate axes as the immediately preceding movement with the exception of being opposite in sign thereby preventing oscillation of said system; and third logic means responsive to said memory output and said outputs from said plurality of sensors for generating said first and second command signal which repeats the immediately preceding movement of said frame in accordance with still another predetermined combination of output signals from said sensors.

12. Apparatus as defined by claim 3 wherein said plurality of sensors each provides an output signal responsive to a sensed condition of fabric and wherein said memory means is responsive to the output signal of said sensors for a preceding movement of said frame and providing a memory output signal in accordance therewith; first logic means for generating a predetermined movement of said frame by generating said first and second command signals to effect a searching pattern when all of said output signals from said sensors are of the same type; second logic means for generating a first choice first and second command signals in accordance with a predetermined combination of output signals from said sensors when at least one output signal is opposite from all other output signals; third logic means for generating a second choice first and second command signals in accordance with the combination of input signals applied when one of said input signals is opposite from the other output signals from said sensors and wherein the movement commanded will retrace previous movement of said frame for preventing oscillation thereby; and fourth logic means for generating a first and a second command signal which will effect a repetition of the preceding movement when selected pairs of output signals are of the same type.

13. The apparatus as defined in claim 12 wherein said plurality of sensors are light-responsive elements and additionally including light means disposed with respect to said sensors for providing a light path thereto.

References Cited

UNITED STATES PATENTS

| | | | |
|---|---|---|---|
| 3,072,081 | 1/1963 | Milligan et al. | 112—2 |
| 3,105,907 | 10/1963 | Colten et al. | 250—202 |
| 3,135,857 | 6/1964 | Von Voros | 250—202 XR |
| 3,135,904 | 6/1964 | Purkhiser | 250—202 XR |
| 3,260,848 | 7/1966 | Gordon | 250—202 |
| 3,224,393 | 12/1965 | Adams et al. | 112—2 |

JORDAN FRANKLIN, *Primary Examiner.*

J. R. BOLER, *Examiner.*